Patented Dec. 26, 1950

2,535,536

UNITED STATES PATENT OFFICE 2,535,536

FLUX FOR PURIFYING METALS

Elmer W. Hagmaier, Pittsburgh, Pa., assignor to The American Metal Company, Limited, New York, N. Y., a corporation of New York No Drawing. Application December 21, 1948, Serial No. 66,580

2 Claims. (Cl. 75—93)

This invention relates to a process for purifying metals and particularly scrap brasses and bronzes, and to a flux useful for same. It also includes a process for using such flux in the cleaning of zinc retorts.

The usual practice heretofore in melting bronze and brass scrap for ingot production is to melt the scrap in a reverberatory furnace with a small amount of flux, one of the more common being borax. This has usually resulted in considerable metal losses by volatilization due in large part to the fact that only small quantities of flux such as borax (too small to flux the metal and prevent volatilization) could be employed in a reverberatory furnace since large quantities would quickly eat up the brick linings and make the process too expensive for commercial operation.

The purpose of using the borax flux was to reduce the amount of oxide formed. It was sometimes the practice, however, to use charcoal in order to prevent the formation of such oxides. Charcoal was generally used after the melting down process whether or not a flux such as borax had been employed during such melting down. The further refining and treatment of the molten metal to prepare it for the production of ingots usually required about 16 hours and during this time, it was necessary to preserve a reducing atmosphere on the bath. This was attempted by the addition of the charcoal. During this period of 16 hours, however, a large quantity of charcoal was necessarily burnt up in the attempt to produce this reducing atmosphere and this was a very expensive operation.

The industry thus has long sought an inexpensive method and material which could be used in sufficient quantity to prevent volatilization of metal, could be used without danger to furnace linings, and which at the same time would not accumulate metal values during its use and could thus produce a "throw-away" slag, so called because of its low metal-value content and particularly low tin content.

I have found in accordance with my invention an inexpensive flux which not only substantially prevents metal losses by volatilization and is non-corrosive to furnace linings, but which accumulates little or no metal and hence is a "throw-away" slag.

The principal object of my invention is, accordingly, to provide such a flux for the melting of bronze, brass and like metals for the production of ingots.

The invention comprises the novel compositions and component mixtures comprised in such compositions, specific embodiments of which are described hereinafter by way of example only and in accordance with what I now consider the preferred manner of practicing the invention.

The materials used in making up my flux are very easily obtainable, namely, ordinary sand and borax, preferably dehydrated. The sand is very cheap while the dehydrated borax is moderate in cost.

I have found further in accordance with my invention that pure $SiO_2$ does not appear to work properly under the below given conditions. I employ ordinary impure sand containing small amounts of iron, lime, magnesia and alumina. Very excellent results have been obtained with an ordinary river sand which assayed 4.20% $Fe_2O_3$, 3.96% CaO, 4.70% $Al_2O_3$, 1.77% MgO, .14% moisture and 83.20% $SiO_2$ (97.97% total).

In practising my invention, I employ the following approximate proportions:

| | Per cent |
|---|---|
| Ordinary river sand | 47–50 |
| Dehydrated borax ($Na_2B_4O_7$) | 53–50 |

I have found that an increase in $SiO_2$ above the amount indicated in the above proportions tends to make a sticky slag and if the borax is used in excess of the amount there shown, the slag becomes too corrosive for the brick work.

The above flux mixture is charged without previous melting of the sand and borax to the reverberatory furnace with the brass and bronze scrap containing zinc oxide, copper oxide and other metal oxides making up the charge. Sufficient flux is charged to provide a complete molten cover for the charge. The brass and bronze scrap are charged through the roof of the furnace with the flux, although both may be shoveled in through the side doors should the furnace not be equipped for overhead charging.

After the charge has melted down, the flux floats on top of the metal bath in a very fluid condition. This flux which may now be called a slag possesses five important qualities: (1) it is liquid, (2) it has a low dissolving power for metals and metal oxides and primarily tin, which is the most expensive metal in present-day bronzes and brasses, (3) it places a thin liquid blanket over the metal bath; its metal dissolving powers are low, and it reduces metal losses by volatilization, both by the blanketing and its low metal content, (4) it allows the penetration of heat to the metal readily, (5) it is not corrosive to the brick-work in the furnace.

When the charge is ready for casting, liquid slag is drawn off and a large part may be thrown away as waste slag. Small proportions of two other kinds of slag occur after the withdrawal of the "throw-away" slag, namely, a slag containing metallic prills but still having some flux value which is returned to the next charge and a second slag which is higher in metal, low in flux value and is sweated in an ordinary reverberatory furnace to remove the metal. This sweating produces such metal and more "throw-away" slag.

Only the last part of the slag removed, as stated, in accordance with my invention, is high enough in metal content to require retreatment and this is very simply done by the sweating operation in a reverberatory furnace whenever enough high grade slag is collected to make a run.

Before the use of my flux, in accordance with the old practice, all of the slag made on the reverberatory furnaces producing brass and bronze ingots, had to be smelted in a blast furnace with coke for the recovery of metals contained. This blast furnace operation is now no longer necessary.

I have found a further use for this flux in accordance with my invention, namely, in the removal of residues from retorts making zinc dust. Zinc dross containing 90 to 97% zinc with some iron, a little lead and some zinc oxide is charged to these retorts. After several charges, a high iron-zinc-lead residue collects which bakes on the retorts and is difficult to remove. It was necessary to remove this residue with steel bars and scrapers at elevated temperatures. By the addition of my flux and heating, it may be easily removed. At present, according to my preferred practice, a little of my flux is added when charging the zinc dross and the baking on never takes place, making it easy to remove the residue at once.

The following is an example of the process employing my flux for brass melting; bronze may also be treated in the same manner:

Example 1 (a).—Melting and ingot production

To an empty 75-ton reverberatory furnace was charged 5000 lbs. of flux mixture containing 2500 lbs. of river sand (of above analysis) and 2500 lbs. of dehydrated borax. After the flux was melted, scrap was charged as rapidly as possible through the hopper in the roof. Another 5000 lbs. of flux mixture of 50% river sand and 50% dehydrated borax was charged with the scrap. The flux formed a molten blanket about 4 inches in depth over the metal underneath.

After the charge was all melted down and refined, the slag was removed and the metal cast into ingots.

The following metal balance shows the materials charged and produced, together with the metal losses:

The analysis of the ingots and three slags produced were as follows:

|  | Weight, Lbs. | Per Cent Cu | Per Cent Sn | Per Cent Pb | Per Cent Zn |
|---|---|---|---|---|---|
| Ingots | 131,963 | 84.03 | 4.58 | 4.54 | 5.78 |
| Slag for sweating | 2,647 | 28.50 | 1.91 | 2.05 | |
| Slag to rerun | 2,859 | 1.95 | .31 | .58 | |
| Slag to throw away | 9,267 | .69 | Tr | .03 | |

Example 1(b).—Treating slag for sweating

As mentioned above, the slag produced designated as "Slag to be sweated" can be sweated in a reverberatory furnace to produce metal and a "throw-away" slag. This was never possible in connection with the old practice, as slags could never be sweated out in this manner.

The following figures represent the products made on 12 furnace charges:

|  | Pounds |
|---|---|
| Scrap charged (12 heats) | 1,718,997 |
| Ingots produced | 1,562,735 |
| Throw-away slag | 89,304 |
| Slag for sweating | 157,133 |

The 157,133 lbs. of slag containing about 22% metal content was charged to a 70-ton reverberatory furnace and melted down.

As the metal collected in the furnace it was periodically tapped to molds with some slag and the metal on cooling is mechanically separated from the slag. A total of 32,578 lbs. of metal was collected.

The assays of the metal and throw-away slags varied within the following limits:

|  | Ingots | Slags |
|---|---|---|
| Cu per cent | 78.65–82.97 | .63–1.14 |
| Sn per cent | 3.32– 8.86 | .23– .90 |
| Pb per cent | 3.20– 4.69 | .36– .70 |
| Zn per cent | 3.24– 8.65 | |

To further illustrate the advantages in direct metal yields and lower metal losses in the melting down of brass and bronze scrap, I show below comparative figures over several months for a large tonnage (9602 tons, see below) melted down with only 1000 lbs. of borax and 1700 lbs. of carbon per charge and a tonnage (2787 tons, see

CHARGED

|  | Lbs. Cu | Lbs. Sn | Lbs. Pb | Lbs. Zn | Lbs. Fe | Lbs. Sb | Lbs. Ni | Lbs. S |
|---|---|---|---|---|---|---|---|---|
| Red Brass Scrap: 139,933 lbs. | 117,194 | 6,395 | 6,353 | 8,550 | 476 | 238 | 532 | 56 |
| Cupro Nickel Scrap: 1,016 lbs. | 711 |  |  |  |  |  | 305 |  |
| Phos. Copper: 100 lbs. | 85 |  |  |  |  |  |  |  |
| Total: 141,049 lbs. | 117,990 | 6,395 | 6,353 | 8,550 | 476 | 238 | 837 | 56 |

|  | Yield Per cent | Yield Lbs. | Lbs. Cu | Lbs. Sn | Lbs. Pb | Lbs. Zn | Lbs. Fe | Lbs. Sb | Lbs. Ni | Lbs. S |
|---|---|---|---|---|---|---|---|---|---|---|
| Ingots (85% Cu, 5% Sn, 5% Pb, 5% Zn) | 93.54 | 131,963 | 110,889 | 6,044 | 5,991 | 7,627 | 238 | 211 | 765 | 66 |
| Butts and Spatters | 2.42 | 3,431 | 2,883 | 157 | 156 | 198 | 6 | 5 | 20 | 2 |
| Pit Cleaning (30%) | .27 | 1,311 | 330 | 18 | 18 | 23 |  | | 2 | |
| Bosh Cleaning (5%) | .08 | 2,501 | 105 | 6 | 6 | 7 | | | | |
| Slag to be rerun |  |  | 2,859 | 56 | 9 | 17 | | | | |
| Throw-Away Slag |  |  | 9,267 | 64 | | 3 | | | | |
| Slag to be Sweated |  |  | 2,647 | 754 | 51 | 54 | | | | |
|  |  |  | 115,081 | 6,285 | 6,245 | 7,855 | 244 | 216 | 787 | 68 |
| Losses and Gains |  |  | −2,909 | −110 | +92 | −695 | −232 | −22 | −50 | +12 | below) with 10,000 lbs. of 50% sand and 50% borax flux:

|  | By Old Process | By Process of Invention |
|---|---|---|
| Charged | 9602 Tons | 2787 Tons. |
| Ingot Yield | 85.91% | 89.73%. |
| Total Yield (including by-products) | 93.74% | 94.14%. |
| Loss | 6.26% | 5.86%. |
| Remarks | Furnaces continually building up. Dirty—Repairs high. | Furnaces clean. No building up. Low repairs. |

It can, of course, be readily seen that .4% increased metal recovery is equal to about 8 lbs. of metal per ton or at 20¢ per lb. (present-day figures), $1.60 per ton charge which is an important figure on large tonnages.

As mentioned heretofore this flux has also been found very beneficial as a flux in retorts used for the production of zinc dust.

These retorts are usually made of graphite and may be about 12" to 18" in diameter and 5 to 6 feet long.

Much zinc dust is made from drosses collected in galvanizing operations and these drosses may run from 90 to 97% zinc, about 3 to 4% iron, 1 to 2% lead and varying amounts of zinc oxide and smaller amounts of other impurities. According to the old practice, this "galvanizers" dross is melted down in a crucible or furnace and poured molten into the retort which is then sealed. As the retort is heated the zinc vaporizes and is collected as dust in a condenser which is connected to the retort. A residue remains in the retort composed primarily of iron (about 30%), lead (about 10%), balance mostly zinc and zinc oxide. This residue builds up and bakes to the retort and causes much trouble. By the use of my flux those difficulties are substantially eliminated.

In the old method the residue stuck to the walls of the retort and this residue had to be removed by chiseling with iron bars and scraping, as above stated, and it was almost impossible to remove all the residue by this method. Sometimes the retorts built up such a thick layer of residue that they could no longer be used after 10 days. The average life of a retort with this practice was about 30 days.

The following is an example of the process employing my flux for cleaning zinc retorts:

*Example 2*

According to my invention, about 20 lbs. of flux, consisting of about 10 lbs. of river sand (of the above analysis) and about 10 lbs. of dehydrated borax, are added to the retort immediately after 1200 lbs. of molten zinc dross have been charged. The flux melts and forms a layer over the top of the molten metal and as the zinc distills off, the metal level becomes lower and the flux washes down the sides of the retort, coating it with a thin film of flux. This film protects the retort wall, helps to seal the pores and thereby prevents iron and other impurities from sticking to the retort wall. The average life of a retort when using my flux is about 60 days, which is twice as long as without the flux. In addition, the cleaner walls of the retort allow better penetration of heat which results in larger zinc dust yields. It is, of course, also easier to remove the residue which remains liquid with the use of flux and requires no chiseling or scraping. This also reduces the time and cost required for cleaning. It is my practice to add about 10 lbs. of flux after the retort is cleaned before charging the next batch of molten dross. A further advantage with this flux is that retorts can be shut down and started up again without damage to the retort and with maximum zinc dust production. This was impossible with the old method because the heavy residue collected in the retort caused cracks in the retort walls on cooling, making it necessary to replace the retort and if this was not the case, the efficiency was greatly reduced. The amount of flux used depends largely on the character of zinc dross used, but this can readily be determined by an experienced operator.

What I claim is:

1. A flux-mixture for purifying scrap metals and removing metallic impurities, consisting of sand and borax in the proportion of about 47 to 50% sand and about 53 to 50% dehydrated borax.

2. A flux-mixture for purifying scrap metals and removing metallic impurities, consisting of sand and borax in the proportion of about 50% sand and about 50% dehydrated borax.

ELMER W. HAGMAIER.

REFERENCES CITED

The following references are of record in the file of this patent:

UNITED STATES PATENTS

| Number | Name | Date |
|---|---|---|
| 720,300 | Vervaet | Feb. 10, 1903 |
| 1,309,165 | White | July 8, 1919 |
| 1,605,641 | Betterton | Nov. 2, 1926 |

OTHER REFERENCES

Foundry Trade Journal, January 21, 1932, page 59. "Deoxidizers and Fluxes," by Bailey.